(12) United States Patent
Satou

(10) Patent No.: US 11,131,292 B2
(45) Date of Patent: Sep. 28, 2021

(54) WIND POWER GENERATION DEVICE

(71) Applicant: Akinori Satou, Asakuchi (JP)

(72) Inventor: Akinori Satou, Asakuchi (JP)

( * ) Notice: Subject to any disclaimer, the term of this patent is extended or adjusted under 35 U.S.C. 154(b) by 169 days.

(21) Appl. No.: 16/484,473

(22) PCT Filed: Feb. 20, 2017

(86) PCT No.: PCT/JP2017/006070
§ 371 (c)(1),
(2) Date: Aug. 8, 2019

(87) PCT Pub. No.: WO2018/150563
PCT Pub. Date: Aug. 23, 2018

(65) Prior Publication Data
US 2020/0003182 A1    Jan. 2, 2020

(51) Int. Cl.
| | | |
|---|---|---|
| F03D 9/25 | (2016.01) | |
| F03D 1/02 | (2006.01) | |
| H02K 7/18 | (2006.01) | |
| F03D 3/04 | (2006.01) | |
| F03D 1/04 | (2006.01) | |

(52) U.S. Cl.
CPC ............... *F03D 9/25* (2016.05); *F03D 1/02* (2013.01); *F03D 3/0436* (2013.01); *H02K 7/183* (2013.01); *F03D 1/04* (2013.01)

(58) Field of Classification Search
CPC ...... F03D 3/0436; F03D 1/04; F05B 2250/50; F05B 2250/5011; F05B 2250/5012; F05B 2250/502; F05B 2250/183; F05B 2250/184; F05B 2240/37
See application file for complete search history.

(56) References Cited

U.S. PATENT DOCUMENTS

| | | | | |
|---|---|---|---|---|
| 7,075,189 B2 * | 7/2006 | Heronemus | ............. | F03D 9/255 290/44 |
| 7,172,386 B2 * | 2/2007 | Truong | ................... | F03G 6/001 415/4.1 |
| 8,598,731 B2 * | 12/2013 | Pitre | ....................... | F03D 3/061 290/55 |
| 9,745,960 B2 * | 8/2017 | Dietzel | .................... | F03D 9/00 |

(Continued)

FOREIGN PATENT DOCUMENTS

| | | |
|---|---|---|
| JP | H11-062811 A | 3/1999 |
| JP | 2003-278635 A | 10/2003 |

(Continued)

*Primary Examiner* — Woody A Lee, Jr.
*Assistant Examiner* — Brian O Peters
(74) *Attorney, Agent, or Firm* — Yokoi & Co., U.S.A.; Toshiyuki Yokoi

(57) ABSTRACT

To provide a wind power generation device that can be suitably increased in size while increasing the electricity generation efficiency. A wind power generation device (10) is characterized by being provided with: a first wind turbine unit (12) comprising multiple wind turbines (30a to 30d) aligned in one line; a pair of blade units (16), each of the blade units being disposed adjacent to the first wind turbine unit (12) and having an inner-side shape extending along the circumferences of circles defined by rotation of the wind turbines (30a to 30d) to enhance collection of wind by the rotation; and a conversion unit for converting energy obtained by the rotation of the first wind turbine unit (12) to electricity.

3 Claims, 9 Drawing Sheets

(56) References Cited

U.S. PATENT DOCUMENTS

| | | | |
|---|---|---|---|
| 10,138,866 B2 * | 11/2018 | Ohya | H02K 7/1838 |
| 10,451,044 B1 * | 10/2019 | Lentini | F03D 7/0204 |
| 2003/0178856 A1 | 9/2003 | Ohya et al. | |
| 2015/0037153 A1 | 2/2015 | Kittel | |

FOREIGN PATENT DOCUMENTS

| | | | | |
|---|---|---|---|---|
| JP | 2003-328922 A | | 11/2003 | |
| WO | WO-2012016259 A2 * | | 2/2012 | F03D 1/04 |

* cited by examiner

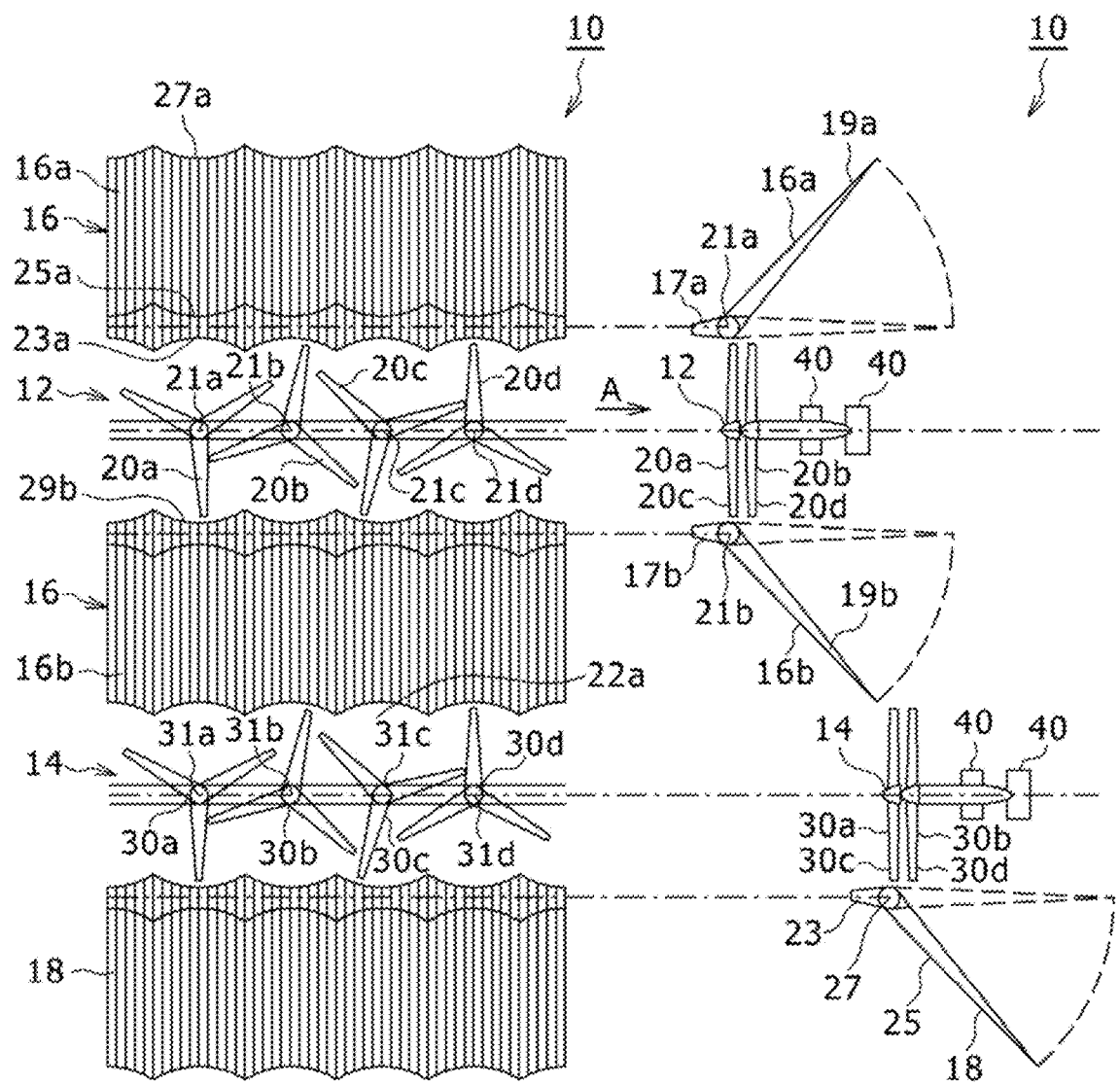

WIND POWER GENERATION DEVICE

TECHNICAL FIELD

The present invention relates to a wind power generation device.

BACKGROUND ART

To date, attention has been paid to the use of natural energy to reduce $CO_2$ emissions from the viewpoint of preventing problems such as global warming. Wind power using wind, which is a natural energy source, has been developed. For example, Patent Document 1 discloses a wind power generation device provided with: a cylindrical wind tunnel body that expands in the direction of wind flow; and a power generating wind turbine placed in the vicinity of a wind inlet opening of the wind tunnel body.

PRIOR ART DOCUMENTS

Patent Documents

Patent Document 1: JP-A 2003-278635

SUMMARY OF THE INVENTION

Problems to be Solved by the Invention

Although the structure disclosed in Patent Document 1 can generate electricity using wind, this structure requires a larger wind turbine to increase electricity generation, and also requires a larger cylindrical wind tunnel body corresponding to such a wind turbine. Accordingly, the structure is not suitable for upsizing.

The purpose of the present invention is to provide a wind power generation device that has increased electricity generation efficiency and can be suitably increased in size.

Means for Solving Problem

The wind power generation device according to the present invention is provided with: a wind turbine unit comprising multiple wind turbines aligned in one line; a pair of blade units, each of the blade units being disposed adjacent to the wind turbine unit and having an inner-side shape extending along the circumferences of circles defined by rotation of the wind turbines to enhance collection of wind by the rotation; and a conversion unit for converting energy obtained by the rotation of the wind turbine unit to electricity.

Preferably, in the wind power generation device according to the present invention, the multiple wind turbines are disposed so that the adjacent wind turbines are offset from each other in a direction along rotation shafts.

Preferably, in the wind power generation device according to the present invention, each blade unit of the pair is pivotable about a rotation shaft disposed at an inner part of the blade unit in a direction along the one line in such a manner as to change the distance between outer ends of the respective blade units.

Preferably, the wind power generation device according to the present invention is further provided with: another wind turbine unit comprising multiple wind turbines aligned in one line, the other wind turbine unit being disposed on an outer side of the pair of blade units to collect wind that is not collected by the wind turbine unit and blows along the pair of blade units; and another blade unit disposed on an opposite side of the other wind turbine unit from the pair of blade units to enhance the collection of the blowing wind.

Effects of the Invention

According to the present invention, a wind turbine unit in which multiple wind turbines are aligned in one line can collect wind to generate electricity. Accordingly, an advantage of the present invention is that the wind power generation device is suitably increased in size because the amount of electricity generation can be increased by increasing the number of wind turbines without increasing the size of the wind turbines.

BRIEF DESCRIPTION OF THE DRAWINGS

FIGS. 1A and 1B show views illustrating a wind power generation device of an embodiment according to the present invention.

MODE FOR CARRYING OUT THE INVENTION

Figure 2A:
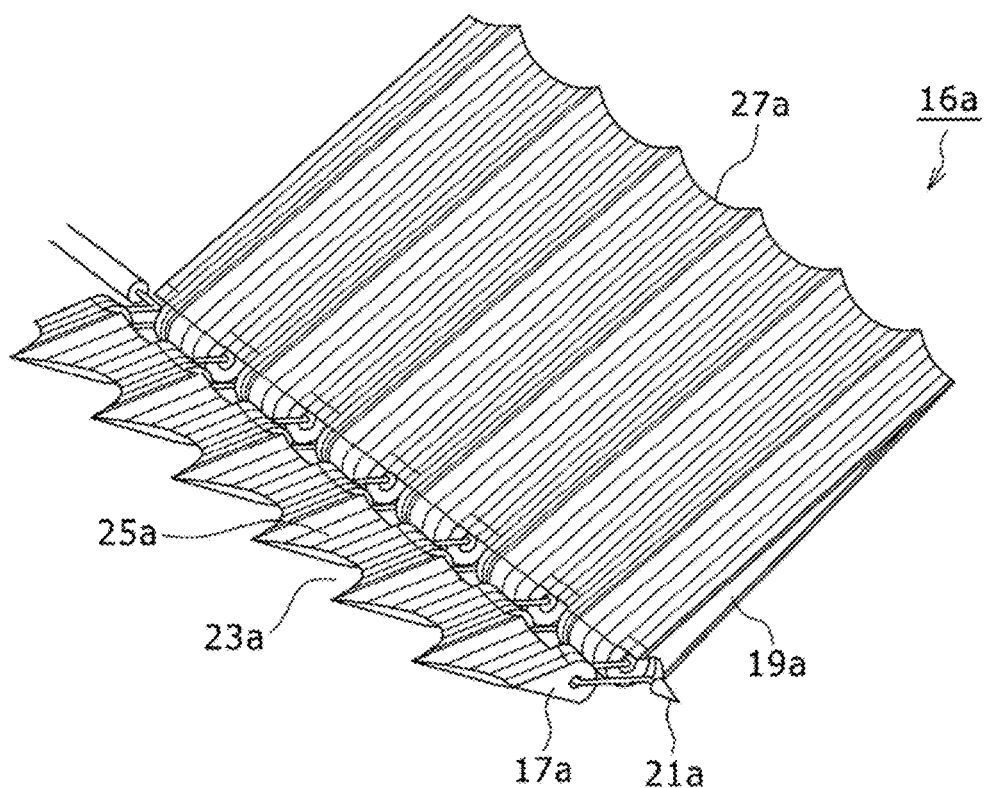
FIGS. 2A and 2B show partially enlarged views illustrating a blade unit of the embodiment according to the present invention.

The following illustrates an embodiment of the present invention in detail with reference to the attached drawings. In all figures of the drawings, the same elements are assigned the same reference numerals to omit redundant explanation. In the description below, the same reference numerals as previously denoted are used as necessary.

Figure 2B:
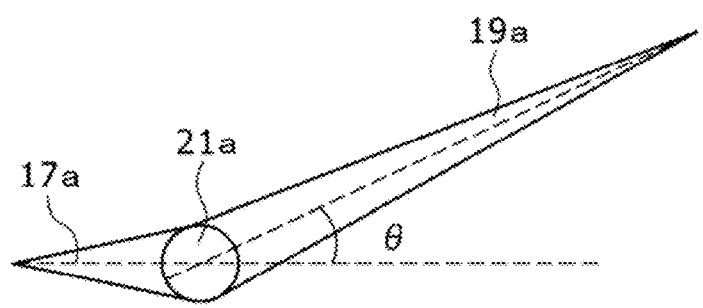
Figure 3A:
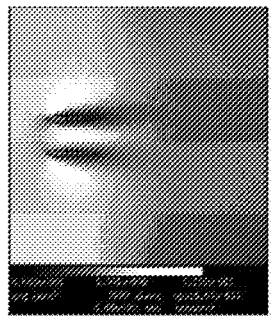
FIGS. 3A-3G show views illustrating a two-dimensional cross-sectional velocity simulation where the other wind turbine unit and the other blade unit in the wind power generation device of the embodiment according to the present invention are omitted.
Figure 3B:
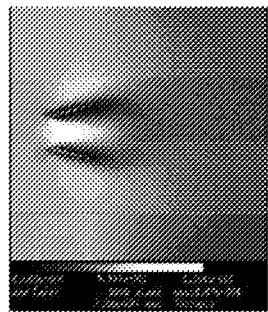
Figure 3C:
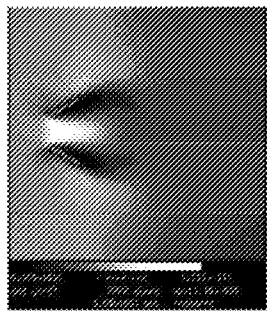
Figure 3D:
Figure 3E:
Figure 3F:
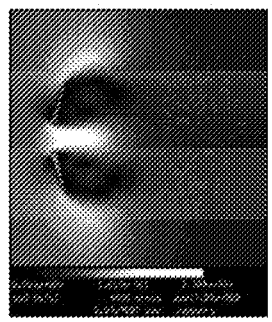
Figure 3G:
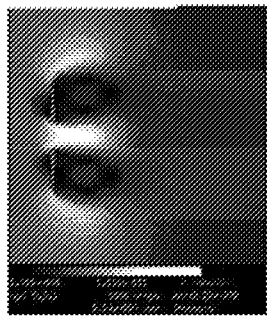

FIGS. 1A and 1B show views illustrating a wind power generation device 10. FIG. 1A is a front view of the wind power generation device 10, and FIG. 1B is a side view of the wind power generation device 10. FIGS. 2A and 2B show partially enlarged views of a pair of blade units 16 of the wind power generation device 10. FIG. 2A is a partially enlarged perspective view of the pair of blade units 16, and FIG. 2B is a partially enlarged side view of the pair of blade units 16.

The wind power generation device 10 is provided with a first wind turbine unit 12, a second wind turbine unit 14, a pair of blade units 16 disposed adjacent to the first wind turbine unit 12, a blade unit 18 disposed adjacent to the second wind turbine unit 14, and a conversion unit 40 for converting wind energy to electricity. The wind power generation device 10 collects wind and produces a slipstream to efficiently generate electricity.

The term "slipstream" means a phenomenon in which as an object with air resistance in an air flow pushes air away, the pressure downstream of the object decreases to generate a vortex of air, and the site where the pressure has decreased draws air therearound.

In the first wind turbine unit 12, the multiple wind turbines are aligned in one line. In this embodiment, four wind turbines 20a to 20d are disposed in parallel. In the wind turbines 20a to 20d, three blades are spaced apart from each other by 120 degrees, and are rotatable about rotation shafts 21a to 21d.

The wind turbines 20a and 20c are disposed on a front stage while the wind turbines 20b and 20d are disposed on a back stage. As a result, the adjacent wind turbines are disposed offset in the direction along the rotation shafts. The front stage and the back stage are preferably spaced apart by a distance that prevents the blades of the adjacent wind turbines from hitting each other. The offset alignment of the adjacent wind turbines in the direction along the rotation shafts 21a to 21d enables the adjacent wind turbines to be positioned so close to each other that the blades of the adjacent wind turbines overlap when viewed in a front view.

Preferably, the wind turbines 20a to 20d are made of a material having appropriate strength. Preferred examples thereof include metals and alloys such as steel, aluminum alloys, and stainless steel. Alternatively, carbon fiber reinforced plastics and other composite materials may be used.

The pair of blade units 16 is provided with a blade unit 16a and a blade unit 16b. Each of the blade units 16 of the pair is disposed adjacent to the first wind turbine unit 12, and has an inner-side shape extending along the circumferences of circles defined by the rotation of the wind turbines 20a to 20d to enhance collection of wind by the rotation.

The blade unit 16a is provided with a fixing part 17a, a pivot part 19a, and a connection part 21a. In FIG. 1, the blade unit 16a is disposed above the first wind turbine unit 12. Preferably, the blade unit 16a is made of a material having appropriate strength. Preferred examples thereof include metals and alloys such as steel, aluminum alloys, and stainless steel. Alternatively, carbon fiber reinforced plastics and other composite materials may be used.

In the fixing part 17a, a lower corrugated region 23a and an upper corrugated region 25a are formed as shown in the front view in FIGS. 1A and 1B. The fixing part 17a has a shape tapered toward the inner side (which is oriented frontward) to reduce the air resistance. The lower corrugated region 23a has recesses that extend along the outer circumferences of circles defined by the rotation of the respective wind turbines 20a to 20d. The upper corrugated region 25a has recesses recessed corresponding to those of the lower corrugated region 23 in the opposite direction to that of the lower corrugated region 23.

In the pivot part 19a, an upper corrugated region 27a is formed as shown in the front view in FIGS. 1A and 1B. The pivot part 19a has a shape that becomes thinner toward the outer side. The upper corrugated region 27a has a plurality of recesses corresponding to those of the upper corrugated region 25a.

As shown in FIGS. 2A and 2B, projections and recesses are formed at the outer end of the fixing part 17a and the inner end of the pivot part 19a to form a hinge connection part. Through holes are formed through the projected/recessed parts. The connection part 21a extends through the through holes and connects the fixing part 17a and the pivot part 19a. The fixing part 17a is fixed with a fixing member (not shown). The pivot part 19a is pivotable. The pivot of the pivot part 19a is controlled by a control device (not shown).

In FIG. 2A, for ease of understanding, the projections and the recesses at the outer end of the fixing part 17a and the projection and the recesses at the inner end of the pivot part 19a are spaced apart, and the connection part 21a is drawn in a zig-zag form. Actually, the projections and the recesses at the outer end of the fixing part 17a and the projections and the recesses at the inner end of the pivot part 19a are engaged with each other such that the through holes thereof match each other, and the rod-like connection part 21a passes the through holes and connects these parts.

When the angle between the fixing part 17a and the pivot part 19a is referred to as angle θ, the angle θ is preferably set to 90 degrees in the case of mild wind, and in the case of strong wind, the parts are rotated so that the angle θ becomes closer to 0. The term "strong wind" used herein means the case where the wind velocity is 25 m/s or more. The wind velocity is measured by a wind velocity sensor (not shown), and the pivot of the pivot part 19a is controlled by the control device based on the measured wind velocity.

The blade unit 16b is provided with a fixing part 17b, a pivot part 19b, and a connection part 21b. In FIGS. 1A and 1B, the blade unit 16b is disposed below the first wind turbine unit 12 such that the blade unit 16b is paired with the blade unit 16a. The blade unit 16b is preferably made of the same material as that of the blade unit 16a.

The fixing part 17b has a similar shape to that of the fixing part 17a. The pivot part 19b has a similar shape to that of the pivot part 19a. The connection part 21b has a similar shape to that of the connection part 21a. The fixing part 17b is fixed with a fixing member (not shown). The pivot part 19b is pivotable. The pivot of the pivot part 19b is controlled by the control device (not shown).

Thus, the control device controls the pivot about the connection part 21a and the pivot about the connection part 21b based on the wind velocity in such a manner as to change the distance between the outer ends of the pivot part 19a and the pivot part 19b.

In the second wind turbine unit 14, the multiple wind turbines are aligned in one line. In this embodiment, four wind turbines 30a to 30d are disposed in parallel. In the wind turbines 30a to 30d, three blades are spaced apart from each other by 120 degrees in the same manner as that of the wind turbines 20a to 20d, and are rotatable about rotation shafts 31a to 31d.

The wind turbines 30a to 30d are aligned in one line on the outer side of the pivot part 19b of the blade unit 16b to collect wind that is not collected by the wind turbine unit and blows along the blade unit 16b. Normally, the pivot part 19b is open at an angle θ of 60 degrees. A lower corrugated region 22b is formed at the outer end of the pivot part 19b, and recesses thereof are positioned to extend along the outer circumferences of circles defined by the rotation of the wind turbines 30a to 30d.

The wind turbines 30a and 30c are disposed on a front stage while the wind turbines 30b and 30d are disposed on a back stage. As a result, the adjacent wind turbines are disposed offset in the direction along the rotation shafts in the same manner as that of the wind turbines 20a to 20d. The offset alignment of the adjacent wind turbines in the direction along the rotation shafts enables the adjacent wind turbines to be positioned so close to each other that the blades of the adjacent wind turbines overlap when viewed in a front view.

The wind turbines 30a to 30d are preferably made of a material having appropriate strength, and are preferably made of the same material as that of the wind turbines 20a to 20d.

The blade unit 18 is provided with a fixing part 23, a pivot part 25, and a connection part 27. In FIGS. 1A and 1B, the blade unit 18 is disposed below the second wind turbine unit 14. The blade unit 18 is preferably made of the same material as that for the blade unit 16b.

The fixing part 23 has a similar shape to that of the fixing part 17b. The pivot part 25 has a similar shape to that of the pivot part 19b. The connection part 27 has a similar shape to that of the connection part 21b. The fixing part 23a is fixed with a fixing member (not shown). The pivot part 25 is pivotable. The pivot of the pivot part 25 is controlled by a control device (not shown).

The conversion unit 40 has a function to convert energy obtained by the rotation of the first wind turbine unit 12 and the second wind turbine unit 14 to electricity. The conversion unit 40 comprises multiple rotating electric machines. The rotating electric machines are attached to the rotation shafts of the wind turbines 20a to 20d and the rotation shafts of the wind turbines 30a to 30d, respectively. When the wind turbines 20a to 20d and the wind turbines 30a to 30d rotate, the rotating electric machines function as power generators to enable the retrieval of electricity through a cable (not shown). Additionally, the rotating electric machines can be used as electric motors by supplying electricity to the rotating electric machines through the cable.

Next, the effects of the wind power generation device 10 having the above-mentioned structure are described. The description is based on an assumption that wind blows in the direction of the arrow A in FIGS. 1A and 1B. The wind blowing to the wind power generation device 10 rotates the wind turbines 20a to 20d to rotate the rotating electric machines, thereby producing electricity. The electricity can be retrieved through the cable (not shown).

The lower corrugated region 23a of the fixing part 17a and the upper corrugated region 29b of the fixing part 17b are located adjacent to the wind turbines 20a to 20d. This structure enhances the collection of wind and causes a slip storm phenomenon. The slip storm phenomenon increases the velocity of wind around the pair of blade units 16.

FIGS. 3A-3G show the results of a computer-based two-dimensional cross-sectional velocity simulation using the wind power generation device 10 without the second wind turbine unit 14 and the blade unit 18. In FIGS. 3A-3G, sites where the wind velocity is higher look brighter, and sites where the wind velocity is lower look darker. As shown in FIGS. 3A-3G, the inlet of wind between the pair of blade units 16 looks brighter than the surrounding area thereof, which proves the velocity increasing effect of the pair of blade units 16.

In FIGS. 3A-3G, in addition to the inlet of wind, regions on the outer sides of the pair of blade units 16 also look bright. This reveals that in these regions, the velocity of wind that is not collected by the first wind turbine unit 12 and blows along the pair of blade units 16 is increased. The second wind turbine 14 and the blade unit 18 are provided to collect the wind without loss.

FIGS. 3A-3G show the results of the simulation which was run while changing the opening degree between the pivot parts 19a, 19b as follows: $\theta=0$ degree in FIG. 3A; $\theta=15$ degrees in FIG. 3B; $\theta=30$ degrees in FIG. 3C; $\theta=45$ degrees in FIG. 3D; $\theta=60$ degrees in FIG. 3E; and $\theta=75$ degrees in FIG. 3F; and $\theta=90$ degrees in FIG. 3G.

Figure 4:
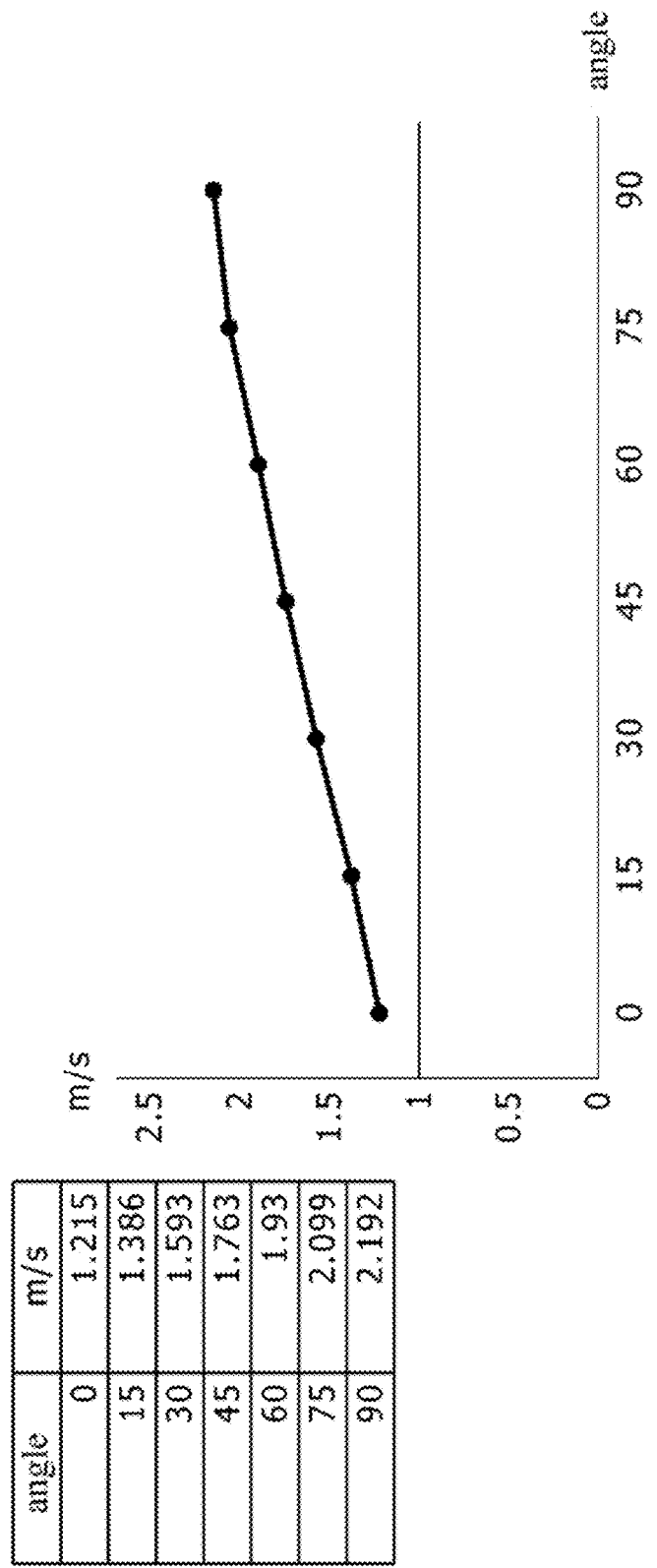
FIG. 4 is a graph created on the basis of the results of the two-dimensional cross-sectional velocity simulation where the other wind turbine unit and the other blade unit in the wind power generation device of the embodiment according to the present invention are omitted.
Figure 5A:
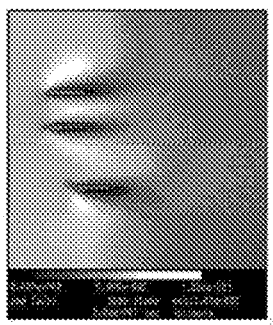
FIGS. 5A-5G show views illustrating a two-dimensional cross-sectional wind velocity simulation in the embodiment according to the present invention
Figure 5B:
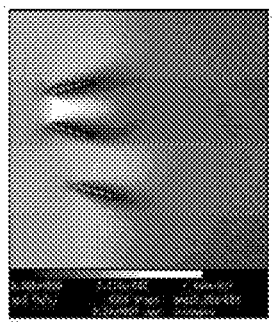
Figure 5C:
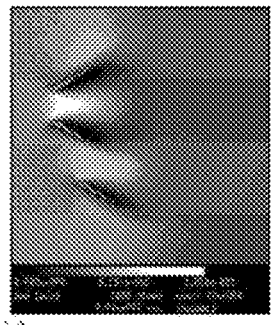
Figure 5D:
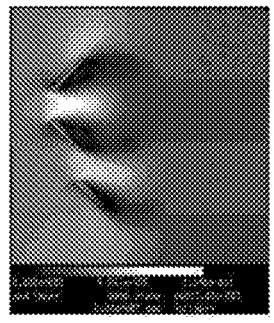
Figure 5E:
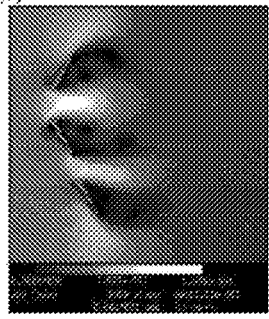
Figure 5F:
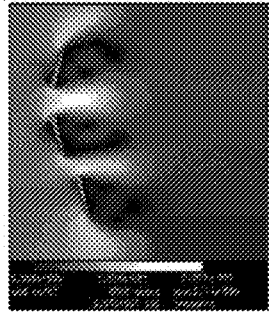
Figure 5G:
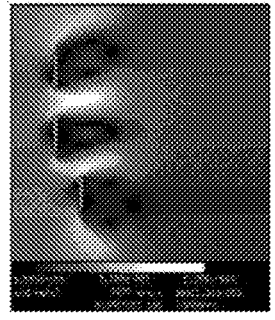

FIG. 4 summarizes, in a graph, the results of the simulation which was run while changing the opening degree between the pivot parts 19a, 19b. The angle $\theta$ of 0 degree resulted in the minimum wind velocity of 1.215 m/s, and a greater $\theta$ resulted in a higher wind velocity. The angle $\theta$ of 90 degrees resulted in the maximum wind velocity of 2.192 m/s, which is almost twice of that obtained when $\theta=0$.

FIGS. 5A-5G show the results of a computer-based two-dimensional cross-sectional wind velocity simulation using the wind power generation device 10 including both the second wind turbine unit 14 and the blade unit 18, unlike FIGS. 3A-3G. In FIGS. 5A-5G, sites where the wind velocity is higher look brighter, and sites where the wind velocity is lower look darker. The inlet of wind between the blade unit 16b and the blade unit 18 also looks brighter than the surrounding area thereof, which proves the velocity increasing effect of the blade unit 16b and the blade unit 18.

FIGS. 5A-5G show the results of the simulation which was run while changing the opening degree of the pivot parts 19a, 19b in the range of the angle $\theta$ of 0 to 90 degrees in the same manner as that in FIGS. 3A-3G.

Thus, the wind power generation device 10 can accelerate wind collected by the first wind turbine unit 12 and the pair of blade units 16. This is advantageous in terms of increasing the electricity generation efficiency. Additionally, according to the wind power generation device 10, the second wind turbine unit 14, the blade unit 16b and the blade unit 18 can collect wind that is not collected by the first wind turbine unit 12 and blows along the blade unit 16b, and accelerate the wind, thereby further increasing the electricity generation efficiency.

In addition to its high efficiency of electricity generation, the wind power generation device 10 can be readily increased in size according to the scale of facilities where the wind power generation device is installed. Although four wind turbines are used to generate electricity in the example described above, additional wind turbines can be used while the length of the pair of blade units 16 is increased according to the number of added wind turbines. This eliminates the need of increasing the size of the wind turbines themselves, unlike the conventional structure disclosed in Patent Document 1, and makes it possible to readily increase the size thereof. Another advantage is that the wind power generation device is suitable for mass production because only wind turbines having a certain size should be produced.

In the above description, the wind power generation device 10 has the second wind turbine unit 14 on the blade unit 16b side to collect wind that cannot be collected by the first wind turbine unit 12. In another preferable example, a wind turbine unit including multiple wind turbines and a blade unit are disposed above to collect wind blowing to the blade unit 16a side.

Figure 6:
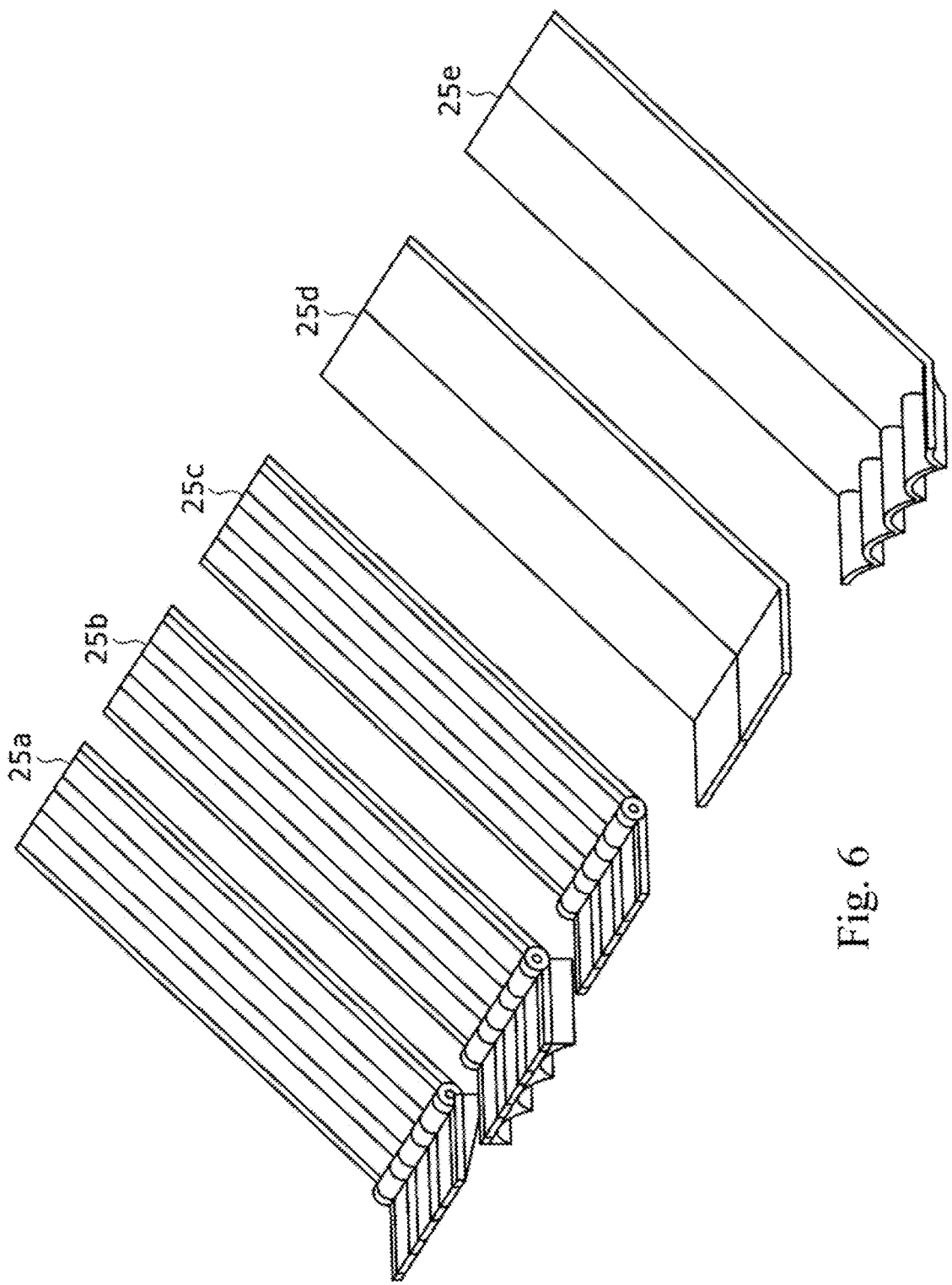
FIG. 6 shows a view illustrating modified examples of the pair of blade units of the embodiment according to the present invention.

In the above description, as shown in FIGS. 1 and 2, the fixing parts 17a, 17b of the pair of blade units 16 have a shape tapered toward the inner side, and the pivot parts 19a, 19b have a shape tapered toward the outer side. However, these parts may have another shape. For example, the fixing parts and the pivot parts may be made of a plate-like member, as shown in FIG. 6.

The blade unit 25a is provided with, in addition to a blade unit 25c having a plate-like fixing part, a tapered member on the lower side thereof. The blade unit 25b is provided with, in addition to the blade unit 25c having a plate-like fixing part, a corrugated member having recesses at a lower part thereof.

Alternatively, the fixing part, the pivot part and the plate-like member may be formed as an integrated member rather than as separate members. In a blade unit 25d, the fixing part and the pivot part are formed as an integrated member unlike the blade unit 25c in which the fixing part and the pivot part are separate members joined via another member. A blade unit 25e comprises, in addition to the blade unit 25c, a corrugated member having recesses as a member corresponding to the fixing part.

Figure 7:
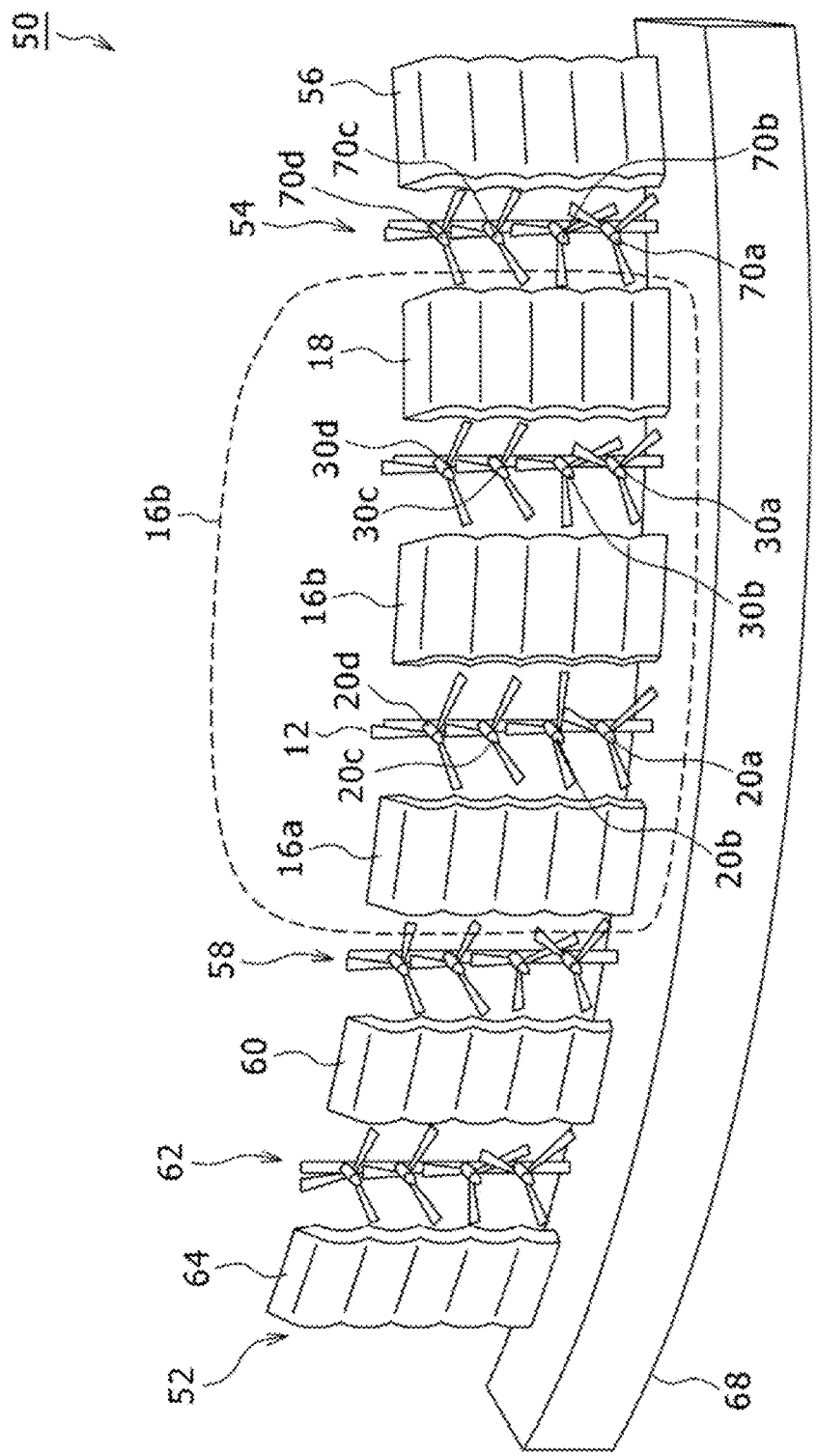
FIG. 7 shows a perspective view illustrating an offshore wind power generation system including the wind power generation device of the embodiment according to the present invention.

Next, an offshore wind power generation system 50 which includes the wind power generation device 10 and is installed offshore is described. FIG. 7 is a perspective view illustrating the offshore wind power generation system 50 including the wind power generation device 10. The offshore wind power generation system 50 is provided with a power generation unit 52 which includes the wind power generation device 10, and a buoy structure 68.

The power generation unit 52 is provided with the wind power generation device 10, a third wind turbine unit 54, a blade unit 56 for enhancing the collection of wind by the third wind turbine unit 54, a fourth wind turbine 58, a blade unit 60 for enhancing the collection of wind by the fourth wind turbine unit 58, a fifth wind turbine unit 62, and a blade unit 64 for enhancing the collection of wind by the fifth wind turbine unit 62. Since the wind power generation device 10 has the same structure as that described above, the detailed description thereof is omitted.

In the third wind turbine unit 54, multiple wind turbines are aligned in one line. In this example, four wind turbines 70a to 70d are arranged. In the wind turbines 70a to 70d, three blades are spaced apart from each other by 120 degrees in the same manner as that of the wind turbines 30a to 30d, and are rotatable about rotation shafts 71a to 71d.

The wind turbines 70a to 70d are aligned in one line on the outer side of the pivot part of the blade unit 18 to collect wind that is not collected by the wind turbine 30a to 30d and blows along the blade unit 18. Normally, the pivot part of the blade unit 18 is open at an angle θ of 60 degrees. The blade unit 18 has a lower corrugated region formed at the outer end of the pivot part, and recesses thereof are positioned to extend the outer circumferences of circles defined by the rotation of the wind turbines 70a to 70d.

The wind turbines 70a and 70c are disposed on a front stage while the wind turbines 70b and 70d are disposed on a back stage. Thus, the adjacent wind turbines are disposed offset in the direction along the rotation shafts in the same manner as the wind turbines 30a to 30d. The offset alignment of the adjacent wind turbines in the direction along the rotation shafts enables the adjacent wind turbines to be positioned so close to each other that the blades of the adjacent wind turbines overlap when viewed in a front view.

The wind turbines 70a to 70d are preferably made of a material having appropriate strength, and are preferably made of the same material as that for the wind turbines 30a to 30d.

Like the blade unit 18, the blade unit 56 is provided with a fixing part, a pivot part and a connection part. In FIG. 7, the blade unit 56 is disposed on the right rear side of the third wind turbine unit 54. The blade unit 56 is preferably made of the same material as that of the blade unit 18.

The fourth wind turbine unit 58, the blade unit 60, the fifth wind turbine unit 62, and the blade unit 64 are disposed on the left rear side in a manner corresponding to the third wind turbine unit 54 and the blade unit 56. The fourth wind turbine unit 58 and the fifth wind turbine unit 62 have the same structure as that of the third wind turbine unit 54. The blade unit 60 and the blade unit 64 have the same structure as that of the blade unit 56.

Thus, the wind power generation device 10, the third wind turbine unit 54, the blade unit 56, the fourth wind turbine unit 58, the blade unit 60, the fifth wind turbine unit 62, and the blade unit 64 are disposed to form a substantially V-shape when viewed from above.

The buoy structure 68 has a flat region on which the wind power generation device 10, the third wind turbine unit 54, the blade unit 56, the fourth wind turbine unit 58, the blade unit 60, the fifth wind turbine unit 62, and the blade unit 64 can be placed, and has a substantially V-shape. Preferably, the buoy structure 68 has a structure which can suitably float in the water, such as a structure including a hollow central part or a structure made of a light material (e.g., foamed styrol). An anchor which allows the offshore wind power generation system 50 to stay afloat in the sea is attached to a central end portion of the buoy structure 68. This enables the offshore wind power generation system 50 to collect wind at a predetermined location without drifting.

The offshore wind power generation system 50 is configured to collect electricity generated by the wind turbines through multiple cables respectively connected to the rotating electric machines. Preferably, the multiple cables run under the sea bed, come out above the ground, and are connected to a facility such as an electric power company.

As described above, the offshore wind power generation system 50 is installed to float in the sea. The sea is an environment where wind can be easily collected because stronger wind blows on the sea than on the ground. Additionally, in the offshore wind power generation system 50, collected wind rotates the wind turbines of the first wind turbine unit 12, the second wind turbine unit 14, the third wind turbine unit 54, the fourth wind turbine unit 58, and the fifth wind turbine unit 62 to generate electricity, and advantageously, the generated electricity can then be used.

Since the offshore wind power generation system 50 is floating in the sea while being connected to the anchor, the buoy structure 68 moves around in response to a change in the direction of wind in such a direction that the first wind turbine unit 12, the second wind turbine unit 14, the third wind turbine unit 54, the fourth wind turbine unit 58, and the fifth wind turbine unit 62 can catch wind. This advantageously increases the electricity generation efficiency even when the direction of wind changes.

Figure 8:
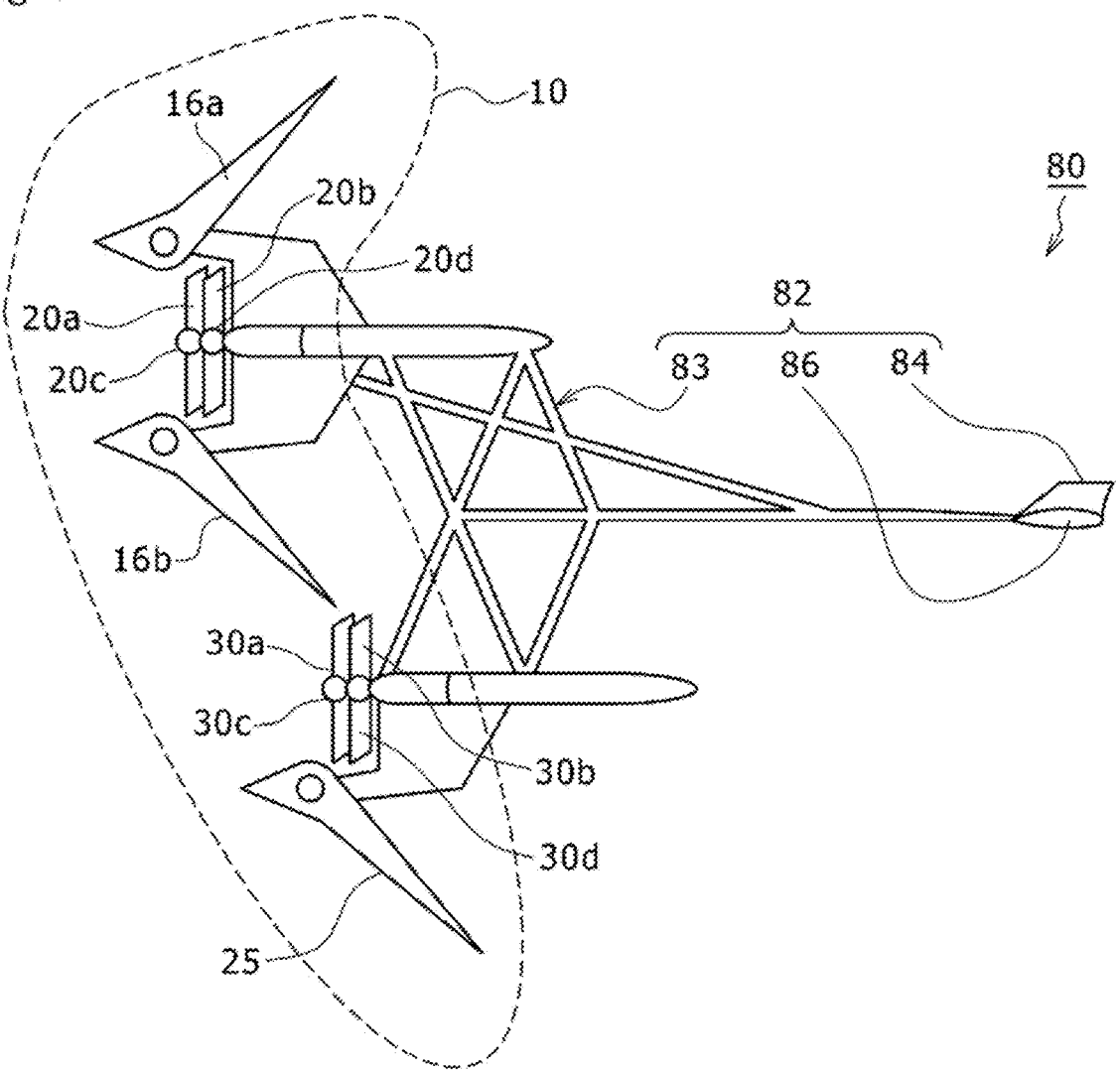
FIG. 8 shows a side view illustrating an airborne wind power generation system including the wind power generation devices of the embodiment according to the present invention.
Figure 9:
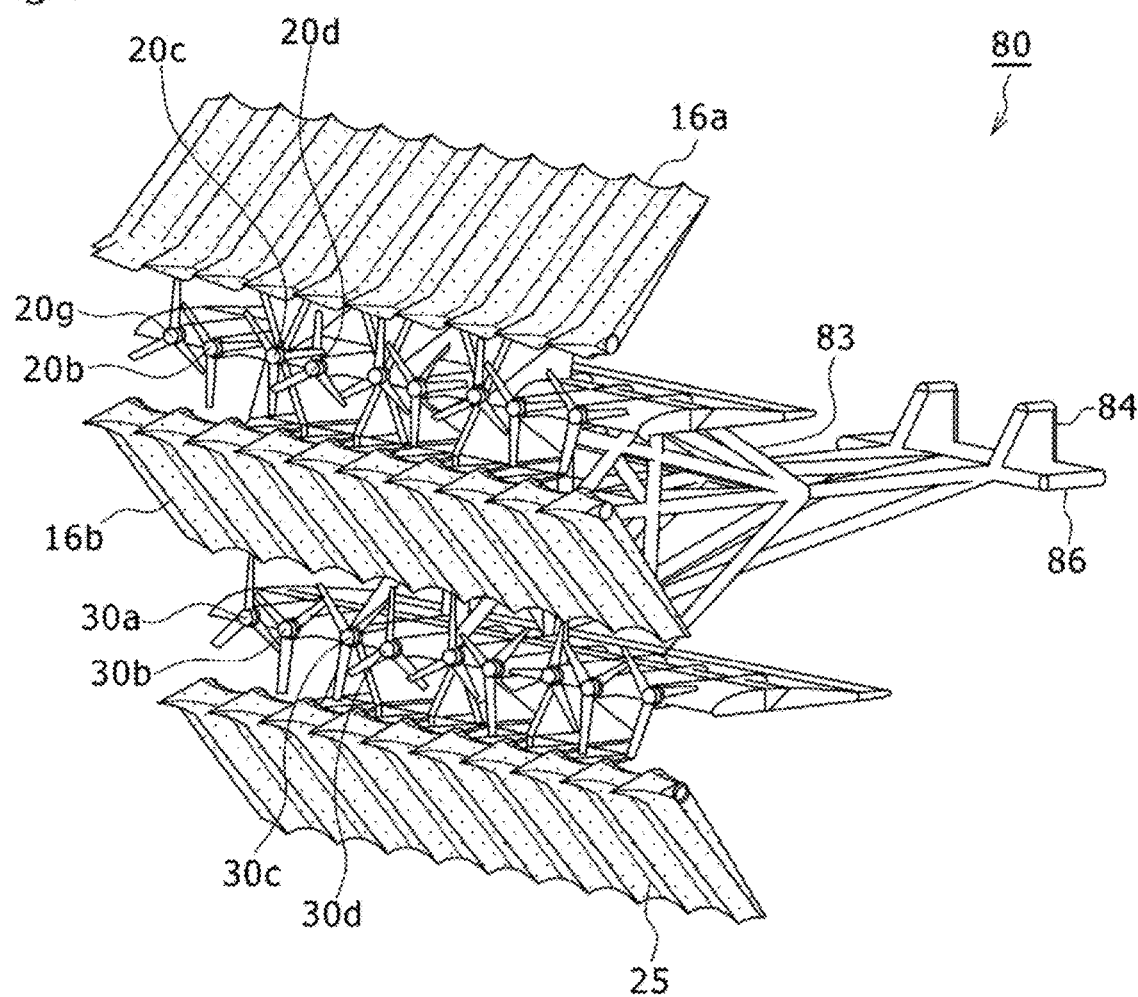
FIG. 9 shows a perspective view illustrating the airborne wind power generation system including the wind power generation devices of the embodiment according to the present invention.

Next, an airborne wind power generation system 80 which includes the wind power generation devices 10 and is installed in the sky is described. FIG. 8 is a side view illustrating the airborne wind power generation system 80 including the wind power generation devices 10. FIG. 9 is a perspective view illustrating the airborne wind power generation system 80 including the wind power generation devices 10. The airborne wind power generation system 80 is provided with the wind power generation devices 10 and a flying structure 82 for allowing the wind power generation devices 10 to fly. In this example, as shown in FIG. 9, two wind power generation devices 10 are connected together in the direction along the lines of wind turbines, and each line includes eight wind turbines.

The flying structure 82 is provided with a body part 83, a vertical tail 84 provided at the rear end and extending in the vertical direction, and a pair of horizontal tails 86 horizontally extending in directions away from each other.

The flying structure 82 is preferably made of a material having appropriate strength. Preferred examples thereof include metals and alloys such as steel, aluminum alloys, and stainless steel. Alternatively, carbon fiber reinforced plastics and other composite materials may be used.

The body part 83 is preferably reduced in weight because it flies in the sky. As shown in FIG. 8, the body part 83 has a skeleton which is reduced in weight as much as possible while ensuring appropriate strength.

The wind power generation devices 10 not only function to generate wind power but also function as propellers and main wings. Specifically, the wind turbines 20a to 20d, 30a to 30d function as propellers, and the pair of blade units 16 and the blade unit 25 function as main wings.

The airborne wind power generation system 80 flies in a jet stream blowing at an altitude of 10000 m or more from the ground. A power cable is installed to extract electricity from the conversion unit 40 of the wind power generation device 10. This power cable extends to the ground. Thus, the power cable not only functions to transmit the power but also functions like a string of a kite to prevent the airborne wind power generation system 80 to be blown out by jet streams.

As described above, the airborne wind power generation system 80 flies in a jet stream in the sky at an altitude of 10000 m or more from the ground. Jet streams are strong winds and provide an environment where wind can be easily collected. Therefore, the airborne wind power generation system 80 is advantageously able to efficiently generate electricity.

DESCRIPTION OF REFERENCE SIGNS

10 Wind power generation device
12 First wind turbine unit
14 Second wind turbine unit
16 Pair of blades
16a, 16b, 18 Blade unit
16b Blade unit
17a, 17b, 23 Fixing part
19a, 19b, 25 Pivot part
20a to 20d Wind turbine
21a, 21b Connection part
23a, 29b Lower corrugated region
25a, 27a Upper corrugated region
27 Connection part
30a, 30b, 30c, 30d Wind turbine
40 Conversion unit
50 Offshore wind power generation system
52 Power generation unit
54 Third wind turbine unit
56 Blade unit
58 Fourth wind turbine unit
60 Blade unit
62 Fifth wind turbine unit
64 Blade unit
68 Buoy structure
70a, 70b, 70c, 70d Wind turbine
72 Fixing part
74 Pivot part
76 Connection part
80 Airborne wind power generation system
82 Flying structure
83 Body part
84 Vertical tail
86 Horizontal tail

What is claimed is:

1. A wind power generation device comprising:
a wind turbine unit comprising multiple wind turbines aligned in one line;
a pair of blade units which is disposed adjacent to the wind turbine unit and enhances collection of wind for rotation of the wind turbines; and
a conversion unit for converting energy obtained by the rotation of the wind turbine unit to electricity,
wherein the multiple wind turbines are arranged in a zig-zag form in which the wind turbines adjacent along the one line are alternately offset in the frontward and backward directions along rotation shafts to prevent the adjacent wind turbines from hitting each other while rotating, and
each blade unit of the pair is pivotable about a rotation shaft disposed at an inner part of the blade unit in a direction along the one line in such a manner as to change the distance between outer ends of the respective blade units.

2. The wind power generation device according to claim 1,
wherein the pair of blade units is disposed adjacent to the wind turbine unit, and has a corrugated inner-side shape extending along the circumferences of circles defined by the rotation of the wind turbines to enhance collection of wind by the rotation.

3. The wind power generation device according to claim 2, further comprising:
another wind turbine unit comprising multiple wind turbines aligned in one line, the other wind turbine unit being disposed on an outer side of the pair of blade units to collect wind that is not collected by the wind turbine unit and blows along the pair of blade units; and
another blade unit disposed on an opposite side of the other wind turbine unit from the pair of blade units to enhance the collection of the blowing wind.

* * * * *